Jan. 27, 1925.
F. B. SMITH
LOADING APPARATUS
Filed Oct. 22, 1923
1,524,459
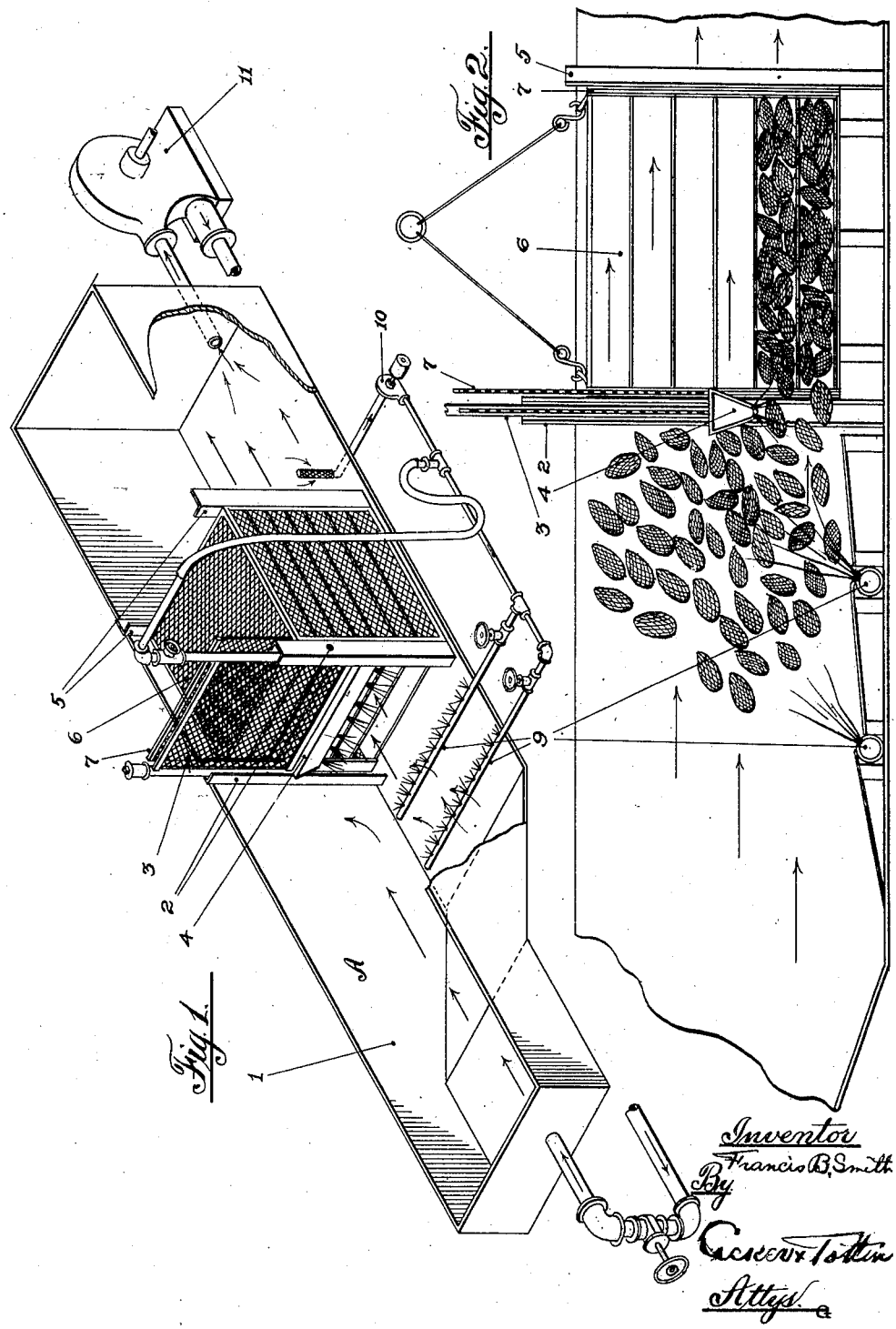

Patented Jan. 27, 1925.

1,524,459

UNITED STATES PATENT OFFICE.

FRANCIS BETTS SMITH, OF SAN FRANCISCO, CALIFORNIA.

LOADING APPARATUS.

Application filed October 22, 1923. Serial No. 670,102.

*To all whom it may concern:*

Be it known that I, FRANCIS BETTS SMITH, a citizen of the United States, residing at city and county of San Francisco and State of California, have invented certain new and useful Improvements in Loading Apparatus, of which the following is a specification.

This invention relates to an apparatus for accumulating and handling diverse articles of commerce and is particularly adapted to the gathering, accumulating and handling of fruit such as pineapples, oranges, limes and any other fruit of the soil that would be amenable to handling in the manner to be described.

In a description of my improved apparatus I will confine my explanation to its operation in connection with the handling of pineapples, with the understanding, however, that the explanation thus given will apply as well to any other articles or product of the soil.

In the ordinary present day apparatus for gathering and handling a pineapple crop, a system is in vogue that requires the handling and rehandling of a vast number of small easily portable boxes, technically known as "lug boxes." These small boxes are of a size to accommodate about two layers of fruit, on account of its size and weight more layers would likely result in crushing damage to the tender surfaced ripe fruit. These boxes must also be of such a size as to be easily handled when filled.

These conditions prohibit the use of large units for the handling and conveyance of this fruit, the present practice therefor consists in substantially the following routine:

The small lug boxes are distributed about a plantation and are filled with freshly gathered pineapples, they are then transported by any suitable means to the location of a train of cars, where they are piled and stacked for transportation to the canning factory, storage or warehouse, which may be located anywhere from a mile to several miles from the field.

Here the boxes are again individually handled, the fruit deposited where needed and the empty boxes returned to the cars to be returned to the field for refilling. This process is repeated ad libitum until the entire crop is gathered.

The individual handling of so many small units requires quite a large force of employees for this one duty and adds considerable to the expense of gathering a crop.

A principal object of my invention for gathering and handling a crop of pineapples contemplates the complete elimination of the lug box, or at least a partial elimination.

Another object of the invention resides in the placing at a central accumulating station, suitably located as regards the extent of the plantation, a large tank provided with a circulating fluid medium. This tank to be provided with a perforate gate or barrier, dividing the tank into two sections or zones. On one side of this barrier will be positioned a large perforate container having perforate gates on opposite sides, or a gate on only one side. This tank will also be provided with a body of liquid which will be maintained in rapid and forceful circulation in a direction to first pass through the perforate barrier in the tank and then through the perforate container.

Another object of the invention is to provide means for gradually admitting pineapples floating in the fluid into compartments in said container whereby said pineapples are compacted therein and caused to fill said container, with other means for then removing said container from said tank and transport the same to another tank station where said container is placed in a similar tank and the compacted pineapples in the compartments are subjected to the flowing force of fluid means and dispelled from said compartments.

Another object of the invention resides in providing suitable circulating means for maintaining a proper movement of the fluid in said tanks whereby the said pineapples are caused to normally move in the direction of flow of the said liquid and thereby assume positions facilitating entry into the compartments of the portable containers.

In carrying out the objects of my invention in a concrete form or apparatus, further objects, advantages and improvements have been evolved than have been recited, and in order to make the invention more clearly understood there are shown, diagrammatically in the accompanying drawings means and mechanism embodying the preferred structural arrangement and disposition of the different parts and combinations, without limiting my claims to the details of construction shown, in which I have simply illustrated one way of embodying my invention in a concrete form of machine. The described devices are simply embodiments of the invention which other structures might also employ and some of the parts or combinations may be used without the others without departing from the purview of my invention. I therefore regard myself as entitled to such variations from the shown and described devices as fall within the scope and meaning of the claims appended hereto.

In the drawings accompanying this specification I have deemed it best to illustrate my invention in diagrammatic form showing only such of the apparatus as will be necessary to convey a clear understanding of the operation involved in handling a crop of pineapples. I have intentionally omitted all power means as there are various types of power devices that are applicable to the operation of my apparatus, and as they only enter into my invention in combination, a simple reference to them seem sufficient. The general arrangement and placement of the mechanism for carrying out my invention are not necessarily shown as representing preferred engineering practice but are shown in their present locations as best tending to give a clear understanding of the apparatus.

Referring now to the drawings forming a part of this specification wheren like figures of reference indicate like parts in the several views:

Figure 1 represents an isometric projection of an apparatus embodying my invention with portions broken away to more clearly show the arrangement and placement of the operating parts.

Figure 2 is a side sectional elevation looking from the front side of Figure 1, somewhat enlarged and showing in more detail the main operating elements connected with my improved apparatus.

The arrows in the several views indicate the direction of flow of the circulatory system and need not be referred to again in this respect.

The numeral 1 indicates a tank of liquid tight construction having an open top. Located near its center are disposed guide members 2 fixedly secured therein and having a channel-shaped cross sectional form. A perforate gate or barrier 3 is mounted for vertical reciprocation in said guide members 2 and is moved by means not shown which may consist of any simple hoisting or elevating device having a reverse movement, a simple block and tackle would suffice for this operation. The lower edge of this gate or barrier 3 terminates in a spray member 4 having holes in its lower edge through which portions of the fluid contents of the tank are forcibly ejected. Spaced away from the guide members 2 are other guide members 5. Removably located between said guide members is a container cage 6, provided with gates 7, or it may have only one gate. The barrier gate 3, container 6 and the container gate 7 are all made of a wire mesh screen material that will give free and unobstructed flow to the liquid medium in the tank. The container 6 may conveniently rest on suitable cross members in the bottom of the tank to thus raise it away from the bottom and give an accumulating space for dirt and débris washed from the fruit passing through the tank, which material may be removed at frequent intervals through suitable openings in the bottom or sides of the tank.

The fluid spray member 4 has a wide upper surface one edge of which extends inward and is adapted to engage the under edge of the container gate 7 and lift it in unison with the opening of the barrier gate 3. The container 6 is provided with spaced compartments in vertical superposed relation and as the gates 3 and 4 are elevated the compartments are gradually opened for the passage of fruit thereinto.

In the forward part of the tank 1 and in front of the gate or barrier 3 is arranged a false floor having lateral openings in which are disposed spray pipes 9 which serve to project sprays of liquid with considerable force up into the body of fruit suspended in the liquid. These sprays add considerably to the buoyancy of the individual fruits and help materially in keeping them afloat and moving. These sprays and the forced flow of the liquid in the tank from the forward to the rear cause the floating fruits to crowd against the barrier gate 3 with an effort to pass through and is the movement that causes them to enter the tray compartments when the gates open.

Pineapples are not completely buoyant and would lie compacted in the bottom of the tank unless the fluid medium is agitated, when agitated, however, they become mobile with the medium and will follow its flow, therefore, as soon as the openings into the several tray compartments in the containers are uncovered the apples will move into the spaces between the trays and become compacted therein.

Fluid for the sprays 9 is derived from the tank by means of the piping shown and is circulated by means of the small circulating pump 10. The main circulation is accomplished through the medium of the large pump 11.

The operation of my improved apparatus would be somewhat as follows:

Assuming that we are dealing with pineapples, the tank 1 is first filled with a suitable fluid, for purpose of illustration we will assume it to be water. Pineapples are deposited en masse in the forward end of the tank at "A." The rapid circulating of the fluid in the direction of the arrows through the action of the circulating pump 11 and the sprays 9 will cause the semi-buoyant fruit to be held in mobile suspension in the water and tend to follow its direction of flow with the result that it will crowd against the outer surface of the gate 3 and be held thereby from further forward movement.

As soon as the gates are raised and the lowermost opening into the container trays is uncovered the apples will begin to move into the lower tray compartment and become quite firmly compacted therein as is indicated in Figure 2, this action continuing as fast as the tray openings are uncovered. The flow of the water will be much more rapid than the movement of the fruit so that the fruit will receive a constant urge to move onward and will as a consequence soon fill the tray compartments. As soon as the trays are full the gates 3 and 7 will be lowered when the powerful spray from the under side of the spray member 4 will force the freely floating apples away from the openings into the trays and thus prepare a free path for the closing gates and thus prevent crushing or damaging any of the fruit.

This filled container will now be removed from the tank by means of a suitable hoisting apparatus, a block and tackle, for instance, and disposed of in any manner provided for, and an empty container placed in the tank when the operation just described will be repeated.

The filled containers may be accumulated on a platform and loaded on a transport train or conveyed by a suitable telpherage system to the point of final distribution. At this point a tank similar to the one just described will be located. This tank will be equipped with a similar circulatory system and will have the same kind of a fluid medium. The filled containers will be placed into the tank of circulating medium and the gate 7 opened when the flow of the medium will tend to sweep the apples out of the compartments into the main body of liquid, here they will be maintained in mobile suspension in the same manner as previously described. This emptying tank will terminate into a fluid runway which will serve as a means of conveyance to carry the fruit to any point of distribution about the cannery, where they may be removed individually or in bulk as may be desired.

The empty containers will be returned to the field for refilling as fast as they are emptied and thus a continuous procession of pineapples in large quantities may be in transit and the handling thereof greatly facilitated.

Besides affording a very economical and efficient manner of handling fruits by this apparatus it also serves as a very efficient washing and cleaning device. All of the dirt and sediment adhering to the fruit being deposited in the bottom of the tank as previously mentioned.

The pineapples as handled by this apparatus are continuously cushioned against shock or bruise from the time they are placed in the loading tank until they are finally disposed of in the cannery or packing house.

The liquid used in the tanks and the liquid runway may carry sterilizing properties whereby the surfaces of the fruit would be rendered sterile and free from contaminating substances they may have gathered during a season of growing in the open air.

I claim:—

1. An apparatus for gathering, handling and transporting fruit consisting of two tanks, a fluid medium in each, means for circulating said medium within said respective tanks, a portable container for immersion in the fluid in one of said tanks, means for opening one side of said container while immersed in the fluid in said tank for the admittance of fruit thereinto by the stream flow, means for closing the open side of said container for confining the fruit therein and while transported to a point of distribution, said closed tank adapted for immersing in the body of circulating fluid in the other tank, means for opening one side of said container while immersed in the latter tank whereby said fruit is removed from said container through the flow action of said fluid.

2. An apparatus for segregating and transporting fruit comprising an open tank, a fluid medium in said tank, circulating pumps and piping for circulating and agitating said fluid medium in said tank, a vertically movable barrier in said tank dividing the same into two compartments, a portable container adapted for placement in said tank in close proximity to said barrier, and means for elevating said barrier affording an opening to one side of said container, to admit fruit thereinto.

3. An apparatus for segregating and transporting fruit comprising an open tank, a fluid medium in said tank, circulating pumps and piping for circulating and agitating said fluid medium in said tank, a perforate vertically movable barrier in said tank dividing the same into two compartments, a perforate portable container adapted for placement in said tank in close proximity to said barrier, movable means for normally closing the container, means for elevating said barrier to open one side of said container to admit fruit thereinto.

4. An apparatus for segregating and transporting fruit comprising an open tank, a fluid medium in said tank, circulating pumps and piping for circulating and agitating said fluid medium in said tank, a vertically movable barrier in said tank dividing the same into two compartments, said barrier having a spray member, a portable container adapted for placement in said tank in close proximity to said barrier, movable means for normally closing the container, means for elevating said barrier to open one side of said container to admit fruit thereinto.

5. An apparatus for segregating and transporting fruit comprising an open top tank, a fluid medium in said tank, circulating pumps and piping for circulating and agitating said fluid medium in said tank, a perforate vertically movable barrier in said tank dividing the same into two compartments, said barrier having a spray member movable therewith, a portable container adapted for placement in said tank in close proximity to said barrier and having a movable gate, means for elevating said barrier and gate to open the said container whereby fruit loosely placed in said fluid medium will be carried into said container by the circulatory flow of said medium, said gate adapted for replacement to its normal position to enclose the fruit in said container.

6. An apparatus for segregating and transporting fruit comprising an open top tank, a fluid medium in said tank, circulating pumps and piping for circulating and agitating said fluid medium in said tank, a perforate vertically movable barrier in said tank dividing the same into two compartments, said barrier having a spray member movable therewith, a portable container adapted for placement in said tank in close proximity to said barrier and having a movable gate, means for elevating said barrier and said gate simultaneously to open one side of said container whereby fruit loosely placed in said fluid medium will be carried into said container by the circulatory flow of said fluid medium.

In testimony whereof I have signed my name to this specification.

FRANCIS BETTS SMITH.